(12) United States Patent
Guyot (10) Patent No.: US 8,401,717 B2
(45) Date of Patent: Mar. 19, 2013

(54) ACTUATOR CONTROL REDUCING THE LEVEL OF VIBRATION OF AN ASSOCIATED FLEXIBLE STRUCTURE

(75) Inventor: Philippe Guyot, Toulouse (FR)

(73) Assignee: Astrium SAS, Paris (FR)

(*) Notice: Subject to any disclaimer, the term of this patent is extended or adjusted under 35 U.S.C. 154(b) by 1587 days.

(21) Appl. No.: 12/042,990

(22) Filed: Mar. 5, 2008

(65) Prior Publication Data
US 2009/0132102 A1 May 21, 2009

(30) Foreign Application Priority Data

Mar. 5, 2007 (FR) .................................. 07 01580

(51) Int. Cl.
G05D 1/00 (2006.01)
G05B 13/02 (2006.01)
G06N 5/02 (2006.01)

(52) U.S. Cl. ................ 701/3; 701/4; 701/13; 244/75.1; 244/164; 244/170; 244/173.2

(58) Field of Classification Search .............. 700/29; 342/33; 701/3, 4, 13; 244/75.1, 164, 170, 244/173.2
See application file for complete search history.

(56) References Cited

U.S. PATENT DOCUMENTS 5,610,848 A 3/1997 Fowell
5,920,278 A * 7/1999 Tyler et al. ...................... 342/33
2003/0018400 A1 * 1/2003 Tuttle et al. ..................... 700/29
2004/0049527 A1 3/2004 Singh

FOREIGN PATENT DOCUMENTS

EP 0251692 A2 1/1988
EP 0319120 A2 6/1989

OTHER PUBLICATIONS

Institute National De La Propriete Industrielle, Preliminary Search Report for French Application No. 0701580, Mar. 5, 2067.

* cited by examiner

Primary Examiner — John Q Nguyen
Assistant Examiner — Rodney P King
(74) Attorney, Agent, or Firm — Patzik, Frank & Samotny Ltd.

(57) ABSTRACT

The aim of the method of controlling at least one mechanical system exhibiting at least one flexible structure element and at least one actuator or group of actuators is to reduce the level of vibrations of said element while controlling the actuator or group of actuators in such a way as to achieve at least one objective assigned to the mechanical system. The control consists of increments having to be carried out at a sampling period T, each of the increments being constant in amplitude in a sampling time interval extending between two successive sampling instants and each of the increments being applied during a duration which is less than or equal to the sampling period T. In each sampling interval, at least one of the initial and final instants of application of the increment is modified by adding a variable, random or pseudo-random, temporal deviation dT.

34 Claims, 6 Drawing Sheets

ACTUATOR CONTROL REDUCING THE LEVEL OF VIBRATION OF AN ASSOCIATED FLEXIBLE STRUCTURE

FIELD OF THE INVENTION

The present invention relates to a method and device for controlling at least one mechanical system exhibiting at least one flexible structure element and at least one actuator or group of actuators, said method and device being intended to reduce the level of vibrations of said flexible structure element while controlling said actuator or group of actuators, in such a way as to achieve at least one objective assigned to said mechanical system, such as carrying out a displacement.

BACKGROUND OF THE INVENTION

A few examples arising from the prior art and known solutions which are aimed at addressing this problem are considered below. A first illustration relates to the orbital control of a spacecraft, for example a telecommunication satellite of a few tonnes that one wishes to position precisely in the vicinity of a given point of the geostationary orbit, once on station. In the case of a chemically propelled satellite, orbital corrections must be made at regular time intervals (typically once a fortnight), in the form of speed increments (typically from 1 to 2 m/s) that have to be imparted to the satellite in each of the directions tangential to the orbit and perpendicular to the plane of the orbit. In the case considered here, these speed increments are carried out physically by virtue of the propulsion system mounted onboard the satellite, by expelling gas through thrusters, the total speed increment that is to be carried out being 50 m/s per year. The satellite control system calculates, according to a predefined algorithm, the opening orders to be dispatched to the gas ejection valves of the various thrusters so as to carry out the desired speed increment. A speed increment in a given direction may be carried out, according to the principle of action-reaction, by controlling the opening of the valve or valves of one or more thrusters ejecting gas in the direction opposite to the speed increment desired.

In the general case covering most space missions, the speed increments to be imparted to the satellites and space probes for orbital control typically range from a few cm/s to a few 100 m/s.

In the very great majority of space applications, the control for opening the valves is an on-off control and not a proportional control. Therefore, the thrust resulting from the opening of a valve is approximately constant (of the order of from 1 to 20 Newtons in the case of the orbital control of telecommunication satellites, from a few tenths to a few hundred Newtons in the general case). The control of the speed increment carried out is performed in open loop, on the basis of a thrust model of the thrusters, by controlling the total duration of opening of the valves of each active thruster. The simplest consists in controlling the opening of the valves in a continuous manner during the time just necessary for carrying out the entire desired speed increment, typically a few hundred seconds in the case considered. However, the continuous opening of one or more valves for such a duration is not recommended, since the perturbing torques resulting from the misalignments of the thrusts of the thrusters with respect to their nominal orientation could exceed the admissible limit and cause the satellite and its payloads to go off target by more than the limit permitted by the mission (typically 0.05 to 0.1 degrees for the application considered).

According to the prior art, in order to remedy this problem, the speed increment is carried out not in one go, in full, by continuously opening the thrusters concerned for the time span just necessary, but rather through a succession of small increments distributed over a larger time span, typically two to four times the duration just necessary in the case of a continuous thrust. The effect produced is on average equivalent to a reduction by the same factor of the equivalent thrust imparted to the satellite during the manoeuvre (correspondingly reducing the harmful transient effect of the perturbing torques), it is not possible for this to be produced through partial opening of the valves of the propulsion system which, let us recall, work according to our assumptions in on-off mode. In practice, according to the prior art, the control orders for opening the thrusters are sampled at a sampling period T. In each sampling interval lying between two successive sampling instants, each active thruster valve is controlled periodically at the period T to the open position in a time interval of duration $\Delta T$ that is strictly less than the sampling period T, and typically equal to an integer fraction of T. For reasons which will become apparent later, the valve opening order is preferably centred in the middle of the sampling interval. Thus, if it is conventionally considered that the control dispatched to each valve's opening system is equal to 1 to instruct total opening, and 0 to instruct total closure, the control signal dispatched to each valve of the propulsion system has the form of a periodic succession, of period T, of small increments of value 1 and of duration $\Delta T$ that are centred in the middle of the sampling intervals, the control being 0 outside of these durations $\Delta T$ (see below the example of FIG. 2a).

It shall be noted that the sampling period T should be chosen as large as possible (typically a few seconds) so as to minimize, during the lifetime of the satellite which is of the order of fifteen years, the total number of opening/closing transients of the valves of thrusters which are sensitive to this parameter. Additionally, this sampling period should be sufficiently large that the increments to be carried out are of a larger order of magnitude than the minimum duration of opening of the thrusters (which is called the Minimum Impulse Bit), below which there is a notable loss of effectiveness and a significant over consumption of fuel.

The advantage of a known method such as this is therefore to spread the achieving of the speed increment over a duration that is larger by a factor $T/\Delta T$ than the duration just necessary in the case of continuous opening of the thrusters, this having the mean effect of decreasing by the same factor the equivalent thrust imparted to the satellite, and hence of correspondingly reducing the undesirable transients due to the perturbing torques. However, against this decisive advantage that should be preserved, this method according to the prior art has a significant limitation, which may weaken or even cancel the anticipated benefit. This limitation is due to the fact that the valve opening control is periodic in nature on account of the spreading of the manoeuvre, as explained above. For example, for values T=1 second and $\Delta T$=0.2 seconds, FIG. 4a (described below) presents the Fourier spectrum of the control profile according to the prior art presented above. This spectrum shows that the energy of the control is concentrated on the integer multiples k/T of the sampling frequency, giving rise to a risk of resonance between the thrust increments imparted to the satellite during the manoeuvre and the modes of vibration of flexible elements, such as, for example, the large solar generators, all the more so as the sampling frequency 1/T is relatively low, for the reasons explained above. It should be stressed that such resonance between an open-loop control for achieving speed increments and flexible modes of large appendages such as solar generators may be extremely harmful because these flexible modes are very weakly damped (damping factor of the order of 0.001).

According to the prior art, one seeks to offset this effect by selecting a sampling frequency 1/T such that its integer multiples are all far enough away from the frequencies of the flexible modes of the solar generators to avoid any harmful coincident or closeness. However, these flexible mode frequencies are known with a significant uncertainty of the order of from 10 to 20%, especially for high frequencies, and so in practice this does not make it possible to reduce the risk of coincidence. Moreover, the density of the flexible modes may be such that it is impossible to find a good location between these modes. Finally, it would be advantageous to increase the sampling frequency so as to push the coincidence problem out to higher frequencies, just where the energy of the flexible modes is not as significant and their effects are more limited, but this increase is constrained by the effects indicated above (number of opening/closing cycles of the thrusters, loss of effectiveness induced by overly short increments).

According to the prior art, it may also be sought to increase the bandwidth of the satellite attitude control so as to control at least the first modes of the flexible appendages and thus reduce the harmful effect of any resonances. However, this solution is also limited by several factors: level of control authority available (problem of saturation), risk of destabilization of the attitude control which must manage a large number of poorly known and very lightly damped flexible modes, prevailing risk of resonance with flexible modes situated outside of the bandwidth of the attitude control.

Another example of a conventional approach relates to the pointing of a large payload exhibiting flexible modes of fairly low frequency. Such is the case, for example, when large solar generators of telecommunication satellites such as those mentioned previously are rotating, having to execute one revolution in 24 hours with respect to the platform of the satellite so as to remain pointing towards the sun throughout the orbit, whilst the satellite remains pointing towards the Earth. These solar generators are set in rotation by stepper motors. The control of these motors is sampled with a period T. Every T seconds, an angular increment control is dispatched to the motor so as to achieve the desired rotation (as described hereinbelow with reference to FIG. 3a). The increments have nominally the same value. Here again, on account of the periodicity of the increments, there is a possible risk of resonance between the control and the flexible modes of the mechanical system to be controlled.

SUMMARY OF THE INVENTION

In response to the abovementioned limitations of the prior art, the object of the present invention is to provide a method of controlling at least one mechanical system comprising at least one flexible structure element and at least one actuator or group of actuators controlled by means of a control signal in such a way as to achieve at least one objective assigned to said mechanical system, said method being intended to reduce the level of vibration of said flexible structure element caused by the activation of said actuator or group of actuators.

Accordingly, the invention proposes a method of controlling at least one mechanical system exhibiting at least one flexible structure element and at least one actuator or group of actuators, said method being intended to reduce the level of vibrations of said flexible structure element while controlling said actuator or group of actuators in such a way as to achieve at least one objective assigned to said mechanical system, such as carrying out a displacement, said control consisting of increments having to be carried out at a period T termed the sampling period, each of said increments being constant in amplitude in a time interval termed the sampling interval extending between two successive sampling instants and each of said increments being applied during an increment application interval of a duration which is less than or equal to said sampling period T, said method being characterized in that, in each sampling interval, at least one of the initial and final instants of application of said increment is modified by adding a variable, random or pseudo-random, temporal deviation dT, termed the random deviation.

What is meant precisely by the expression random deviation, in relation to a respective sampling interval, is therefore a respective value of a discrete series of random values advantageously having the same probability law, and advantageously being statistically independent of one another.

However, given a mathematically defined probability law, the realization by a known computer program of random values obeying this ideal probability law leads to a series of numbers which have statistical properties approximating said ideal probability law, without however obeying it perfectly. Such a series of numbers is said to be "pseudo-random", and loosely speaking, these numbers are attributed with the ideal probability law from which they are presumed to arise.

The benefit of the method according to the invention is as follows. The nominal control (before applying the method of the invention) is a repetition of increments (which, in the general case, might not all be perfectly equal) with a period T. Even though this control signal is not necessarily perfectly periodic (unequal increments, imperfections of realization, etc), it nevertheless has a strong frequency content centred on the sampling frequency 1/T and its harmonics, thus leading to the risks mentioned above. The addition according to the invention of a "random deviation", according to the above definition, to at least one instant of application of the increments of the control makes it possible to modify the frequency content of the control while attenuating its periodic nature. Depending on the probability law chosen, all or some of the energy peaks centred on the integer multiples of the sampling frequency 1/T will be attenuated, or even eliminated, as is described hereinbelow in respect of particular examples. The probability law for the random deviation is chosen advisedly, so as to minimize the energy peaks by priority just where the resonances might be the most prejudicial, that is to say close to the frequencies of vibration of the flexible elements of the mechanical system.

The person skilled in the art may readily generalize the method of the invention when, not the control itself, but one of its time derivatives has the time profile which is the subject of the method (periodic series of increments). In this case, the method may be applied to said derivative having these characteristics, and the control is calculated as the integral of corresponding order of this modified derivative.

According to a particular implementation of the invention, for each sampling interval, the duration of application of said increments is equal to the sampling period T, and a random deviation according to the invention is added to the initial instant of application of said increments (the final instant of an increment being the initial instant of the next).

According to another particular implementation of the invention, for each sampling interval, the duration of application of said increments is strictly less than the sampling period T and a random deviation is added either at the initial instant, or at the final instant, or at both the initial and final instants of application of said increments, with values that may be different in the latter case.

As variants of the above implementation, in each sampling interval, the same random deviation is added both at the initial instant and at the final instant of application of said increments, this having the effect of temporally translating the whole of the increment or command step having to be implemented, by a value equal to the random deviation applied.

As explained previously, it is advantageous to define the probability law chosen to determine said random deviation in such a way as to modify at least one of the energy peaks of the control, while decreasing, displacing or eliminating at least one of the undesirable energy peaks, and in particular those which coincide, or are close to the natural frequencies of flexible elements of the mechanical system considered.

Advantageously, the maximum absolute value of the random deviation is less than a fixed value, preferably an integer fraction of the sampling period, so that the increment modified by the random deviation may be implemented fully inside its sampling interval, without spilling over to the next.

In most cases, the random deviation has zero mean, so that the mean effect of the modified control according to the method of the invention is the same as that of the initial or nominal control.

For practical reasons of computer implementation, the values of the random deviation may be selected from among the integer multiples of a predefined value T', the latter possibly being an integer divider of the sampling period T.

In this case, the frequency 1/T' may be chosen in such a way as to limit any resonances with the modes of vibration of said flexible structure element, and preferably do not coincide with the natural frequencies of said vibration modes.

In order to simplify the practical implementation of the invention, a probability law chosen to determine said random deviation is fully defined by a finite number of parameters calculated in such a way as to modify at least one of the energy peaks of the control.

In a particular implementation of the invention according to this general principle, the probability law determining said random deviation is a discrete probability law with M values, said M values and their probabilities being calculated in such a way as to modify at least one of the energy peaks of the control.

For example, the probability law determining said random deviation is a binomial law, taking extreme values of random deviation +dTmax with a probability of ½, and −dTmax with a probability of ½. In the case of a random translation of the increments, the effect is to decrease the energy of the control at the frequencies k/T, integer multiples of the sampling frequency 1/T, in a ratio cos ($\omega$.dTmax) where $\omega$=2.$\pi$.k/T, and k is a natural integer.

In another implementation, the probability law determining the random deviation is a discrete law with M equiprobable values in arithmetic progression between a minimum value −dTmax and a maximum value +dTmax of the random deviations, with dTmax=T.(M−1)/2M. In the case of a random translation of the increments, the effect is that the spectrum of the control cannot include energy peaks at the frequencies 1/T, 2/T, . . . (M−1)/T, as well as (Mp+1)/T, (Mp+2)/T, . . . (Mp+M−1)/T where p is a natural integer.

It is also possible to choose as probability law for determining the random deviation according to the method of the invention, a law which is uniform between extreme values of random deviation dTmin and dTmax, the values dTmin and dTmax being chosen to modify at least one energy peak of the control.

More particularly, it is possible to choose, as probability law determining the random deviation, a law which is uniform between maximum values −dTmax and dTmax. In the case of a random translation of the increments, the effect is to decrease the energy of the control at the frequencies k/T integer multiples of the sampling frequency 1/T, in a ratio sin($\omega$.dTmax)/($\omega$.dTmax) where $\omega$=2.$\pi$.k/T.

In the latter case, it is possible to choose dTmax=T/2, so that the frequency spectrum of the control does not include any energy peak at the sampling frequency 1/T.

Another choice may be dTmax=T/4, so that the frequency spectrum of the control does not include any energy peak at the odd multiple frequencies of the sampling frequency 1/T.

For the purposes of numerical implementation of the method, the random deviations according to the invention take the values of successive numbers of at least one random or pseudo-random sequence of numbers that is produced at each sampling period by at least one computer program generating random or pseudo-random numbers.

The deployment of the method is even simpler if the random deviations according to the invention take the values of successive numbers of a long but finite sequence of numbers exhibiting pseudo random or random characteristics close to desired characteristics, said sequence being precalculated and applied according to the method, then reproduced in a loop once it is completed.

The subject of the invention is simultaneously a computer program product comprising code instructions adapted for the implementation of the method according to the invention and as defined hereinabove, when it is loaded and executed on computing means.

Moreover, a device for implementing the method according to the invention, comprises calculation and computing means allowing the execution of the program product according to the invention and as defined above, and electrical and/or electronic means making it possible to transform digital control orders formulated by the calculation and computing means into electrical signals dispatched to at least one actuator, said device being such that at least one computer program of said program product is implemented by said calculation and computing means so as to produce said increments of said control of at least one of said actuator and group of actuators of said mechanical system in such a way as to achieve at least one objective assigned to said mechanical system, such as carrying out a displacement;

said computer program is implemented to produce, at each sampling period T, said random deviation according to a probability law that best approximates a desired probability law;

said computer program is implemented to modify, at each sampling period, the instant or instants of application of said increment by adding thereto said random deviation, according to the method according to the invention, and to thus produce the digital control to actually be applied to said mechanical system; and said electrical and/or electronic means transform said digital control produced by said computer program into electrical signals allowing at least one of said actuator and group of actuators to physically carry out the assigned control.

In the case where the control according to the method of the invention is modified using a long but finite sequence of random deviations having the desired random characteristics, said sequence is calculated beforehand, then advantageously stored in a memory of said calculation and computing means, said random deviations being, successively and in an established order, added to at least one instant of application of said increments of said control, said sequence being reproduced in a loop once it has been completed.

It may be advantageous that at least part of the parameters involved in the calculation of the random deviations by said computer program of said device, such as the parameters of a probability law, or a sequence of random values, may be modified in the course of the operation of said mechanical system, so as for example to optimize the effectiveness of the method (if a posteriori knowledge is available about the modes of vibration of the flexible elements of the system, and in particular their natural frequencies).

For example, the device for implementing the method according to the invention may be such that it comprises at least one dedicated sensor for measuring the vibrations of at least one flexible structure element present in the mechanical system, means for calculating the frequency spectrum of these vibrations, and means for modifying parameters involved in the calculation of said random deviations so as to reduce the level of said vibrations by modifying at least one of the energy peaks of the frequency spectrum of the control.

As mentioned already, the method of the invention is applied to the control of the opening of at least one thruster of a system for control of orbit, stabilization and/or orientation of a craft moving through space, such as a launcher, artificial satellite, interplanetary probe, said craft comprising at least one flexible structure element, such as large appendages, antenna, solar panel, and primary structure, etc.

More precisely, this application of the method of the invention consists in
  controlling the opening of at least one thruster so as to impart a speed increment to said craft making it possible to correct the trajectory of said craft;
  nominally carrying out said speed increment as a series of small increments performed periodically with a period T;
  carrying out said small increments through the control of opening of at least one thruster, said control being conventionally equal to zero for a thruster closure order, and to one for a thruster opening order;
  before the implementation of said method, calculating a nominal control so as to be periodic of period T in the time interval [Ti, Ti+N.T], where N is an integer, for realizing a total impulse, and, in said time interval, equal to an increment of one over all the time intervals [Ti+k.T+T1, Ti+k.T+T2] where k is an integer less than N, T1 and T2 being constants such that $0<T1<T2<T$, T2-T1 being the width of the control notch carrying out said small impulses, and equal to 0 the remainder of the time;
  modifying said nominal control according to said method, by adding to at least one of the initial Ti+k.T+T1 and final Ti+k.T+T2 instants of application of the increment, a random temporal deviation having desired characteristics with the aim of minimizing the resonances of said control with the modes of vibration of said flexible structure element;
  in the case where a random deviation is applied at both the initial and final instants of application of the increment, said random deviation being able to be the same for both said instants, in which case the control notch is simply translated randomly in time, or indeed being able to be different for one from what it is for the other of both said instants.

The person skilled in the art understands that the general method according to the invention deals with the realization of an open-loop control of the mechanical system or of a part at least of the mechanical system, such as for example orders for opening thruster(s) making it possible to carry out in open loop a speed increment to correct the orbit of a satellite. However, closed-loop control is usually added to this open-loop control so as to correct small deviations with respect to a given setpoint. In the case of orbital control for example, it is necessary to control the attitude of the satellite when carrying out the speed increment, so that this increment is performed in the desired direction with respect to the orbit. In this phase, the thrusters are also used to perform this closed-loop attitude control. In fact, both controls, open loop for carrying out the speed increment, and closed loop for attitude control, are added together before being dispatched to the propulsion system. In practice, the closed-loop attitude control orders themselves take the form of increments controlling the opening of thrusters for a certain time span, in general small relative to the orbital control opening time. Now, the two types of increments cannot be added together in this case, since the thruster can only be on-off controlled. Therefore, the increments must be temporally disjoint. In general, the attitude control increments are carried out at every start of the sampling intervals, and as they are of very short duration, this leaves time in each sampling interval to carry out the orbit control increments, all the more so since the latter are advantageously centred in the middle of the sampling interval, as suggested at the start of the description.

In an alternative implementation according to the invention, also advantageous, the control increments serving for the closed-loop attitude control are not performed at the start of the sampling interval, but are adjoined to the control increments for the orbital control. In this case, the application of the method of the invention is such that on top of said random deviations is added to one only of the initial and final instants of application of the increment another temporal deviation, calculated in a known manner to carry out an attitude or pointing control of the space craft at the same time as the speed increment control is carried out for the orbit control.

Generally, this additional temporal deviation is small (typically a factor 10) relative to the duration T2-T1 of application of the increment.

In another type of application of the method according to the invention, the rotation of at least one stepper motor are controlled for the pointing of at least one payload of a spacecraft, such as at least one solar panel, an antenna, an instrument etc., said payload exhibiting at least one flexible structure element.

In this case, the application of the method of the invention is such that:
  a control $\alpha$ of the angle between the stator and the rotor of said motor is sampled at a sampling period T, and is incremented by a certain value at each sampling period,
  a nominal control $\alpha$ takes the form: $\alpha_k = \alpha_{k-1} + (d\alpha)_k$ where $\alpha_k$ represents the constant value of the control between the instants k.T and (k+1).T, where k is an integer, and $(d\alpha)_k$ is the value of the increment to be carried out at the date k.T, the increments being performed by convention at the sampling instants,
  said control is modified according to the method of the invention by adding, to the instants k.T at which the increments are carried out, a random time deviation having desired characteristics with the aim of minimizing resonances with modes of vibration of said flexible structure element.

A particular case of this application is such that the increments $(d\alpha)_k$ are all equal, as in the case of keeping a solar panel rotating at constant speed.

As previously, a closed-loop control signal may be superimposed on the open-loop control signal that one wishes to modify according to the invention. In this case, the application of the method of the invention is such that the nominally equal increments $(d\alpha)_k$ are slightly modified, in a known manner, so as to carry out the control of at least one physical phenomenon resulting from the rotation of the motor, such as the steering of a satellite having a solar sail in the case of the control of a solar panel furnished with at least one flap.

In the case of the control of a stepper motor, the method of the invention may be applied to other rotation profiles that are more complex than simple rotations at constant speed, such as for example low-frequency alternating toggling. In this case, the application of the method according to the invention is such that the frequency spectrum of the nominal control to be applied to the motor is situated principally at frequencies well below the sampling frequency, in particular to carry out a low-speed scanning movement.

BRIEF DESCRIPTION OF THE DRAWINGS

Other characteristics and advantages of the invention will become apparent in the course of the following description of a few embodiments, given by way of nonlimiting examples with regard to the appended drawings.

for FIG. 4b, and $$dTmax = \frac{T}{3}$$

for FIG. 4c.

DETAILED DESCRIPTION OF THE INVENTION

Figure 1A:
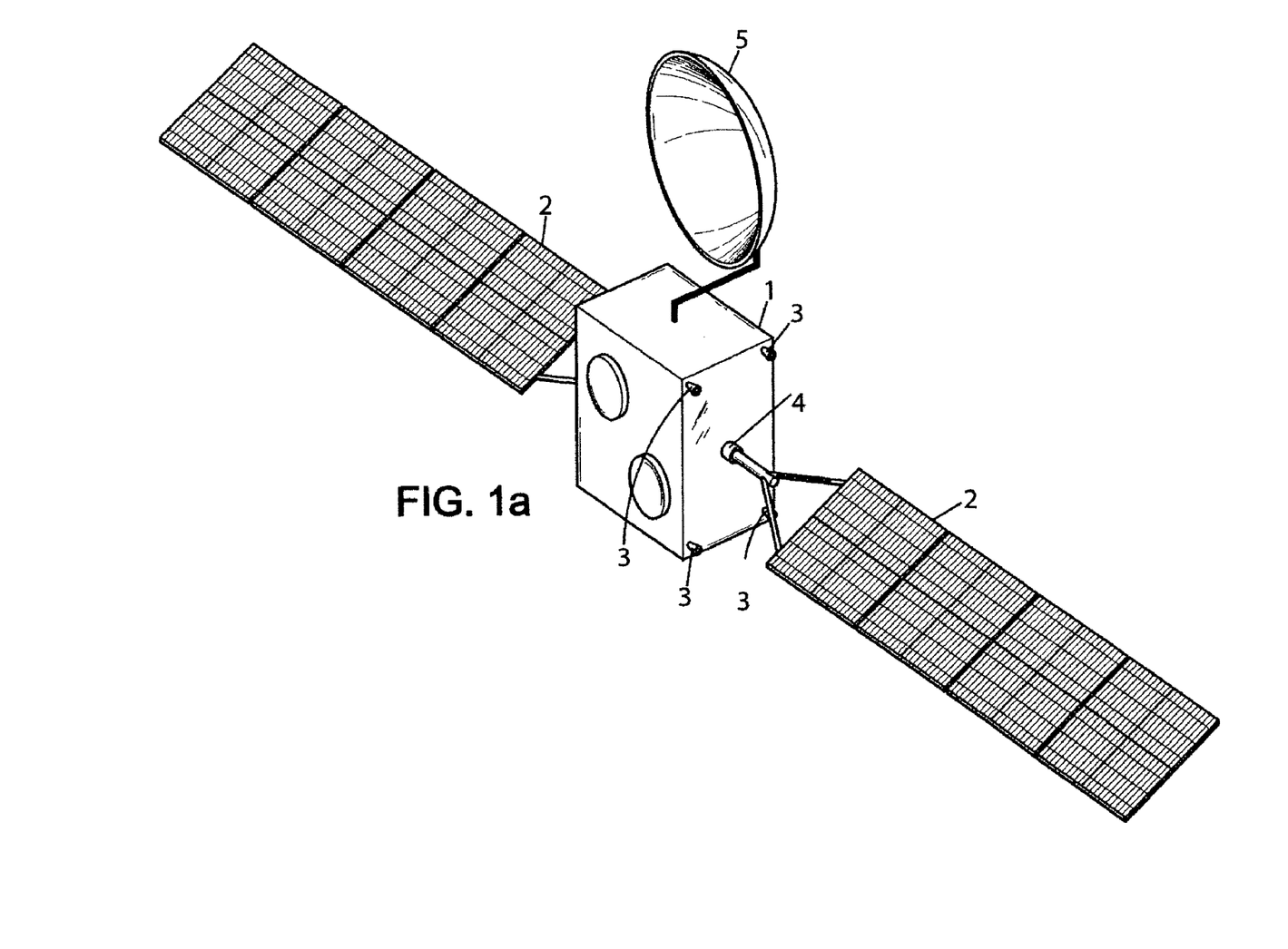
FIGS. 1a and 1b represent respectively in perspective and schematically a satellite with solar panels deployed such as in orbit, and in which the invention is implemented.
Figure 1B:
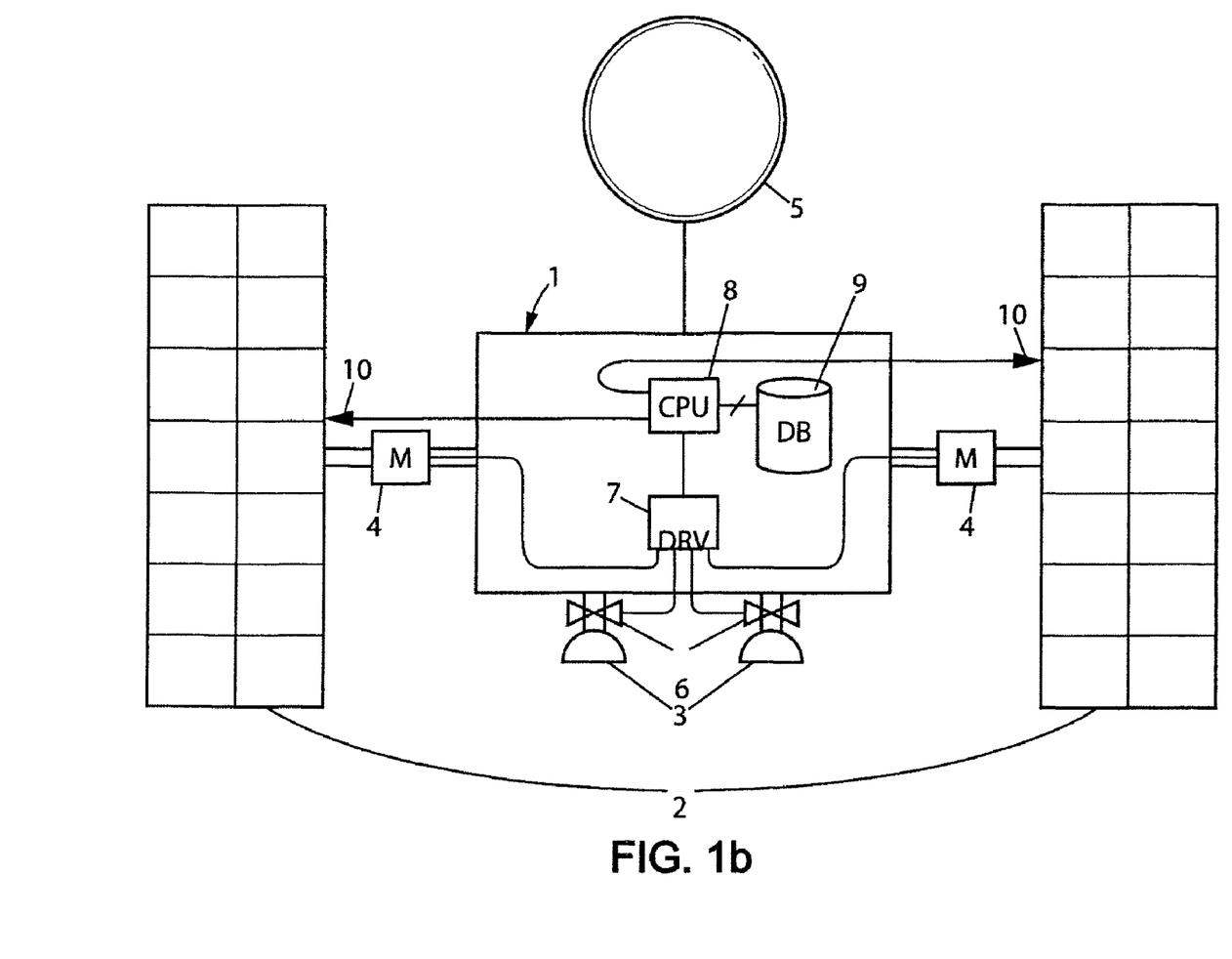

FIGS. 1a and 1b schematically represent a satellite 1 which comprises a plurality of solar panels or generators 2, useful for electrical power supply and payloads like antennas such as 5. This satellite 1 can control its attitude and/or its orbit by means of thrusters 3 (see FIG. 1a) which can, as a whole, exert a thrust in one or more directions. Certain elements of the satellite 1 such as the solar generators 2 or payloads, such as the antennas 5, can have very large dimensions, with very low frequency vibration modes which may be excited by the attitude and orbit control of the satellite 1.

The thrusters 3 are actuated by supply valves 6 (see FIG. 1b) which allow the opening of the thrusters 3 so as to exert a thrust in a predetermined direction. This makes it possible to adjust the orbit of the satellite 1 so as to maintain a correct altitude, or to improve the satellite pointing conditions, for example within the framework of an optical communication with another satellite, or of a radio communication with an earth station.

The control of each thruster 3 is performed by successive openings for a predetermined duration of the corresponding supply valve 6. The effect of this is to generate a constant thrust for the duration of opening of the valve 6. The intensity of the force applied by the thrusters 3 can therefore be modulated solely by the duration of opening of the valves 6.

The orientation of the solar panels 2 is controlled by stepper motors 4. These are electric motors each of whose input signal is not a simple analogue current or voltage, but a value representative of the angle of the rotor of the motor 4 with respect to a reference point. The minimum rotational step of these motors 4 depends on the type of motor considered. These motors 4 allow simple regulation of the orientation of the solar panels 2 as a function of the orientation of the sun in relation to the satellite 1.

The stepper motors 4 and the supply valves 6 for the thrusters 3 are actuators controlled by a device 7 for applying the control signal. This device (DRV) 7 is controlled by an electronic central processing unit (CPU) 8, which calculates and generates the control signal that is applied by the application device 7 to the various actuators 4 and 6.

Figure 2A:
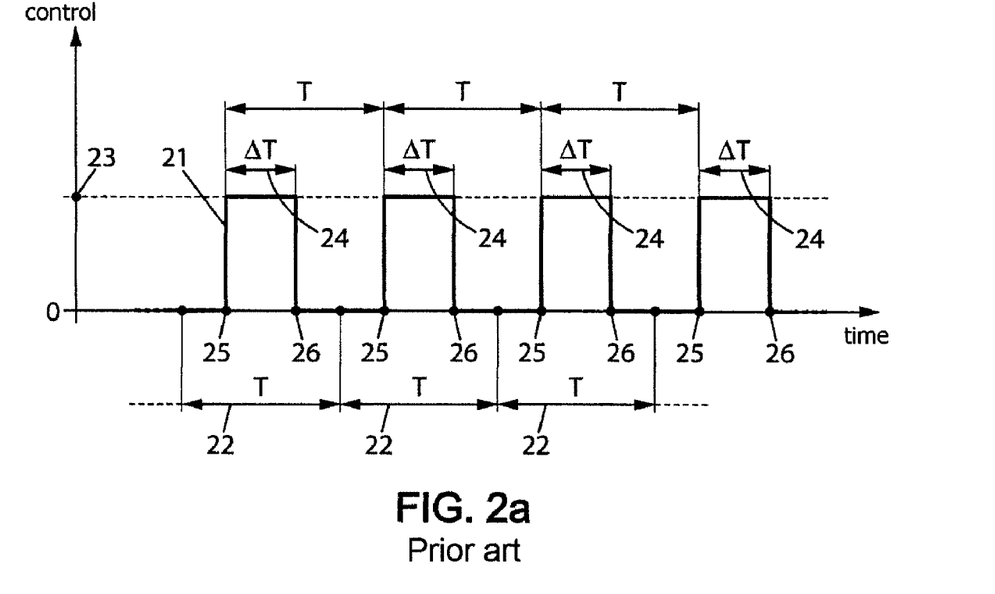
FIGS. 2a, 2b and 2c are, respectively, a time chart representing the temporal evolution of a conventional control signal in the case of an orbital control of the satellite of FIGS. 1a and 1b, and two time charts representing the temporal evolution of the same control signal modified according to two embodiments of the invention.
Figure 2B:
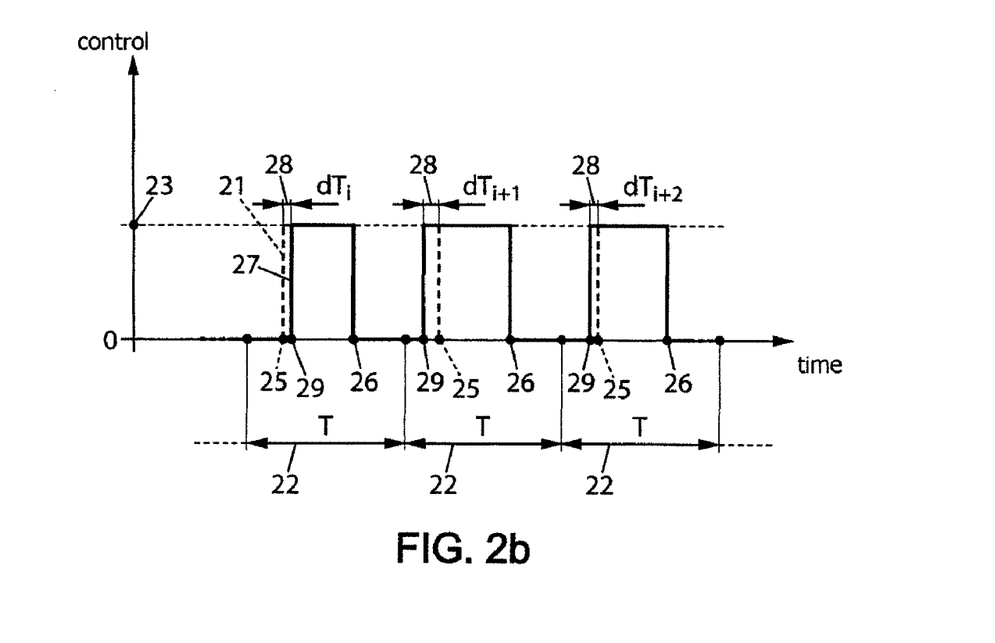
Figure 2C:
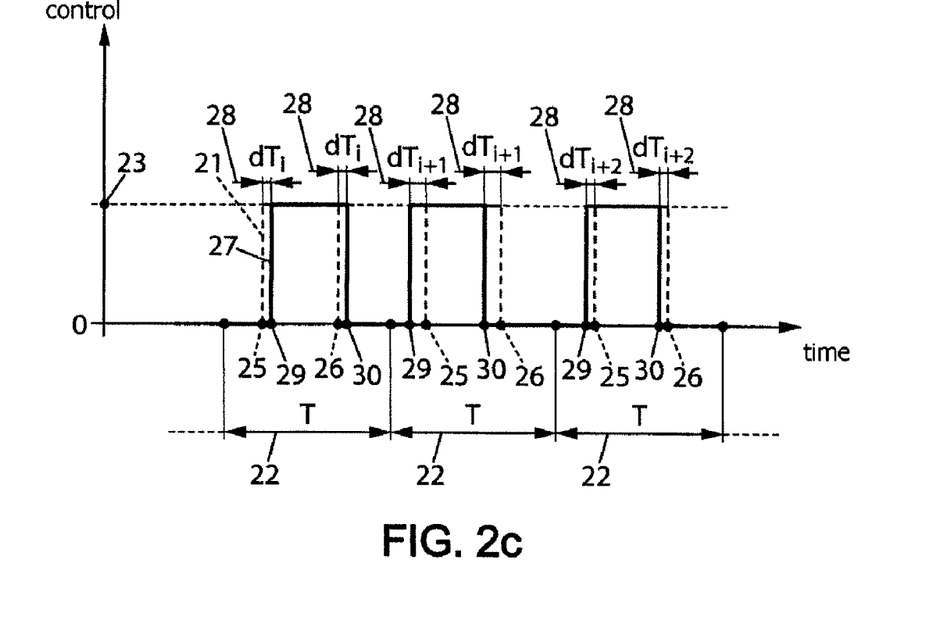

The central unit 8 can, according to an embodiment, generate a sequence of random temporal deviations (dTi) 28 or 35 (see FIGS. 2b, 2c and 3b) complying for example with a predetermined probability law, so as to generate a control signal, such as 27 in FIGS. 2b and 2c, to be applied by the control signal application device 7. This control signal is formed of a succession of increments 23 or 33 (FIGS. 2b, 2c and 3b). In the case of the control of valves 6 of thrusters 3, these increments 23 (see FIG. 2b) have the form of a pulse of substantially constant amplitude and duration. In the case of the control of the stepper motors 4 (FIGS. 3a and 3b), each control corresponds to an angular step of an increment 33. The control signal, whose nominal temporal control profile (before applying the method of the invention) is represented at 21 or 31 by solid lines in FIGS. 2a and 3a (which represent the corresponding nominal controls), and by dashes in FIGS. 2b, 2c and 3b (which represent the controls modified by applying the method of the invention), comprises a succession of sampling intervals 22 or 32, repeated periodically, with the period T, and hence with a determined frequency f equal to 1/T. Inside each of the sampling intervals 22 or 32, an increment 23 or 33 is generated, and is kept applied, either for an interval 24 of application of the increments 23 which is of strictly lower duration ΔT than the duration T of the sampling interval 22 in the case of the control of the valves 6 of the thrusters 3, or for the sampling interval 32 of duration T in the case of the control of the stepper motors 4. However, according to a first exemplary implementation of the invention, the initial instant 25 or 34 or possibly the final instant 26 of application of the increment 23 or 33 is modified, as at 29 in FIGS. 2b and 2c, in a random manner by the central unit 8. For this purpose, the central unit 8 makes it possible to delay or advance the initial instant 25 or 34 or possibly the final instant 26 of application of each increment 23 or 33 by a random temporal deviation (dTi) 28 or 35 with respect to a reference instant in its respective sampling interval 22 or 32. In general, for a nominal control according to FIG. 2a, the middle of the sampling interval 22 is taken as reference instant.

According to another embodiment, the central unit 8 is connected to a database (DB) 9 formed by the data storage means. Inside this database 9 there exist sequences of temporal deviations dTi that are pseudo random. These sequences may be considered to be a series of random variables, if the number of elements in the sequence is sufficient, and if this sequence is repeated in a loop. Such sequences or series of pseudo random variables may be generated by known computer programs.

Furthermore, the satellite 1 may moreover comprise vibration sensors 10, disposed at the level of the flexible elements such as for example the solar generators 2, and capable of accurately measuring their vibration frequencies. The sensors 10 are linked to the central unit 8 so as to calculate the frequency spectrum of said vibrations so that the central unit 8 generates the random or pseudo random sequences of deviations dTi as a function of the frequency spectrum and of the vibration level detected by the sensors 10.

In a more detailed manner, in FIG. 2a is represented the time profile 21 of a nominal (conventional) control signal used, for example, for the orbital control of a satellite 1. In this case, the signal 21 represents the orders for opening and closing valves 6 of thrusters 3.

By convention, this signal equals 1 to instruct opening, and 0 for closing. This signal comprises increments 23 (opening order) to be carried out periodically with a period T, termed the sampling period. In each sampling interval 22, the increment 23 is effected over an increment application interval 24 of duration $\Delta T$ which, in this particular case, has a strictly lower duration than the sampling period T. The interval 24 of application of the increment is, preferably, centred on the sampling interval 22, but FIG. 2a presents the general case where the initial instant 25 of application of the increment 23 and the final instant 26 of application of the increment 23 are not symmetric with respect to the centre of the sampling interval 22.

Represented in FIG. 2b is the time profile 27 of a control signal modified from that of FIG. 2a, by applying a first particular implementation of the method according to the invention, which consists in adding a random, or pseudo random, temporal deviation (dTi) 28 that may be positive or negative, and hence correspond respectively to a temporal delay or advance, to the initial instant 25 of application of the increment 23 so that the new initial instant or modified initial instant 29 occurs randomly around the value of the old initial instant 25.

An alternative, but preferred, implementation of the method is depicted in FIG. 2c, where, in this case, the same random deviation (dTi) 28, positive or negative, is applied at the initial instant 25 and at the final instant 26 of application of the increment 23, so that the new interval of application of the increment extending between the new initial 29 and final 30 (modified) instants is just the old interval of application 24 translated by a random time deviation (dTi) 28. In FIGS. 2b and 2c, dTi is positive when dTi+1 and dTi+2 are negative.

Figure 3A:
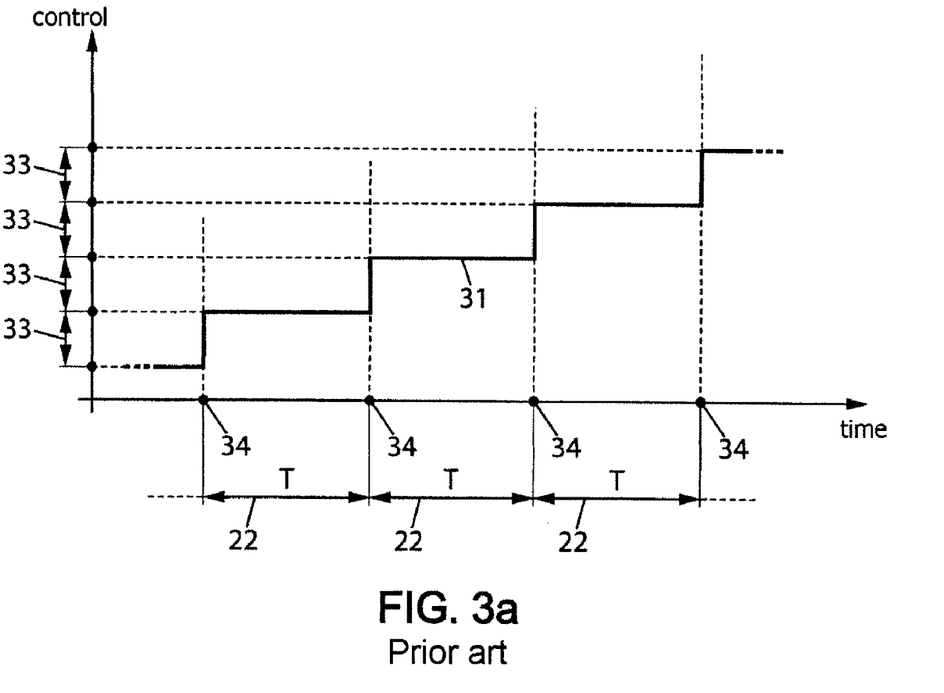
FIGS. 3a and 3b are respectively a time chart representing the temporal evolution of a conventional control signal in the case of the pointing of a solar generator by a stepper motor, and a time chart representing the temporal evolution of the control signal modified according to an embodiment of the invention.
Figure 3B:
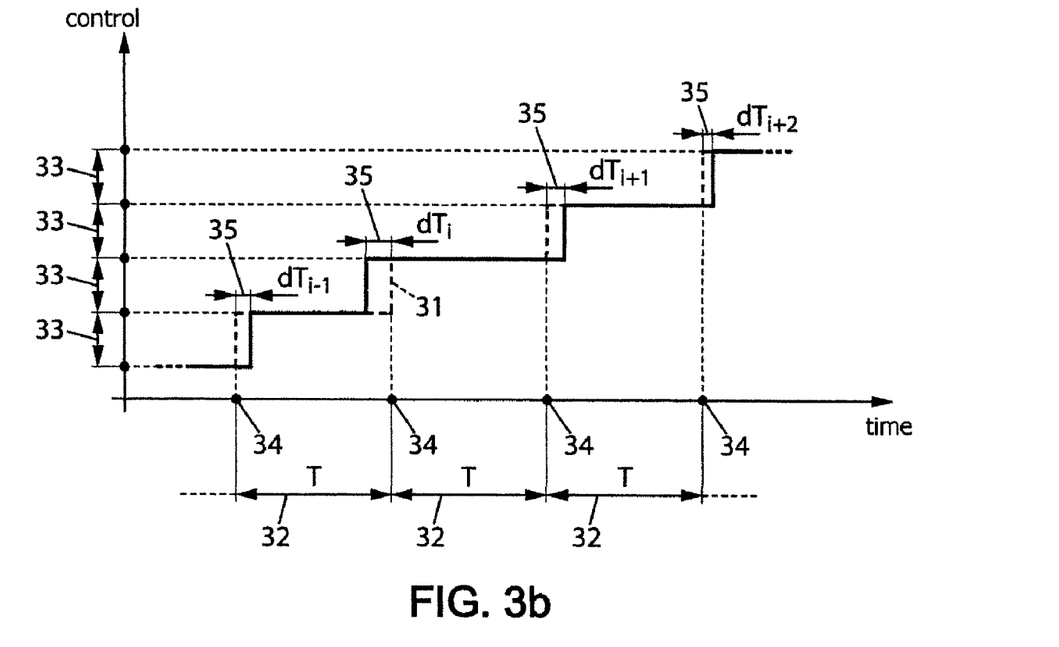

In another implementation, applicable in particular to the control of a stepper motor 4 for driving a solar generator 2, the time profile 31 of the nominal control signal (before applying the method of the invention) represented in FIG. 3a consists of increments 33 which are applied successively to the whole set of successive sampling intervals 32, of duration T, the instants of application of these increments 33 being conventionally the sampling instants 34.

FIG. 3b shows how the nominal control signal of FIG. 3a is modified according to an implementation of the method of the invention. A random time deviation (dTi) 35 (which may be positive or negative and correspond respectively to a temporal delay or advance), and which is randomly variable from one sampling interval 32 to the next, is applied at each instant of application 34 of the increment 33, given that, in this case, the final instant of application of an increment corresponds to the initial instant 34 of application of the next increment. In FIG. 3b, dTi−1, dTi+1 and dTi+2 are positive, and dTi is negative, but the sum of the random deviations may be zero, that is to say the deviations (dTi) have zero mean.

In order to understand the influence of the random deviation dTi on the spectrum of the control signal, it is appropriate to compare the spectrum of the conventional control signal and that of the control signal modified after applying the method according to the invention. Returning to the case of the conventional control signal of FIG. 2a, denoted f(t), the energy of this periodic signal is concentrated at the frequencies that are multiples of the sampling frequency 1/T, as shown by its frequency spectrum represented in FIG. 4a. At the frequency k/T, where k is a natural integer, the spectrum of the signal is given precisely by the Fourier coefficient $F_k$ of rank k of the signal where, by definition:

$$F_k = \frac{1}{T} \int_{nT}^{(n+1)T} f(t) e^{-i\omega t} dt \text{ with } \omega = 2\pi k/T$$

Figure 4A:
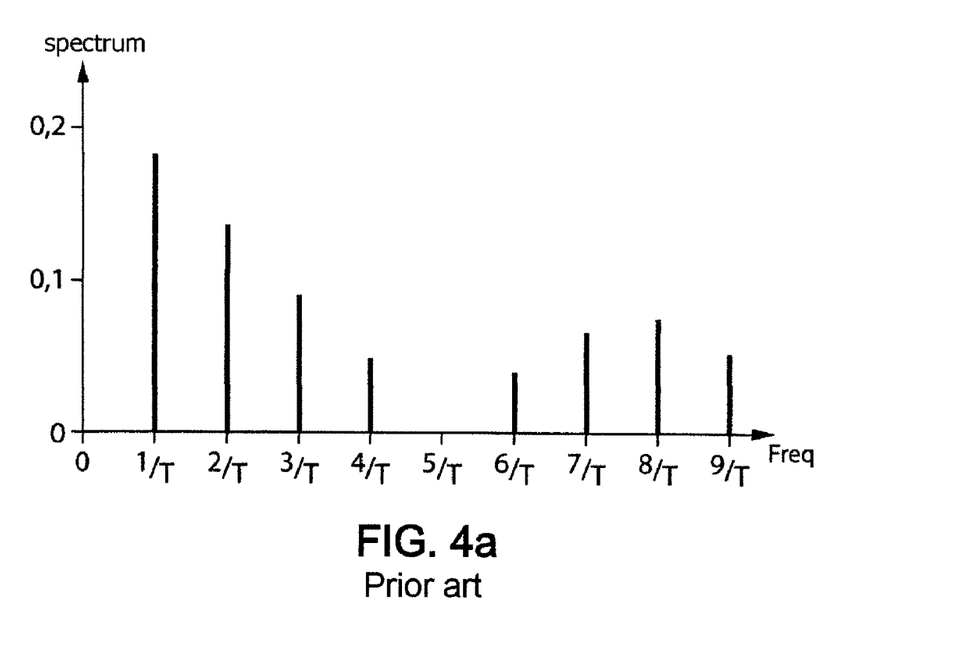
FIGS. 4a, 4b and 4c are spectral representations respectively of the conventional control signal, corresponding to the signal represented in FIG. 2a, and of the same control signal modified according to the embodiment of the invention corresponding to FIG. 2c, with a random deviation according to a discrete probability law with three equiprobable values −dTmax, 0 and +dTmax, with $$dTmax = \frac{T}{4}$$

In the case considered:

$$F_k = \frac{\Delta T}{T} \frac{\sin(\omega \Delta T/2)}{\omega \Delta T/2} e^{-i\omega T/2} \text{ where } \omega = 2\pi k/T$$

which yields the numerical values of FIG. 4a, wherein is represented the norm of the coefficients $F_k$ in the case where T=1 second and $\Delta T$=0.2 seconds (dTi=0 since this is the nominal control signal).

In order to generalize to the case of the signal modified by the method according to the invention, it is noted that the Fourier coefficient of rank k may also be written, on account of the periodicity of the function f(t):

$$F_k = \frac{1}{(2N+1)T} \int_{-nT}^{(n+1)T} f(t) e^{-i\omega t} dt$$

A calculation shows that it is possible to pass to the limit:

$$F_k = \lim_{N \to \infty} \frac{1}{(2N+1)T} \int_{-nT}^{(n+1)T} f(t) e^{-i\omega t} dt$$

This formula may be applied to any particular realization of the signal modified, according to the method, by adding a random deviation (a modified signal such as this will be denoted $\tilde{f}(t)$). We firstly make the assumption that at each sampling interval 22, the same random deviation dT(n) is applied to the initial instant 25 and to the final instant 26 of application of the increment. In this case, which is that of FIG. 2c, the Fourier transform of the modified signal at the frequency k/T, denoted $\tilde{F}_k$, is given by the formula:

$$F_k = \lim_{N \to \infty} \frac{1}{(2N+1)T} \int_{-nT}^{(n+1)T} \overline{f}(t) e^{-i\omega t} dt$$

$$= \lim_{N \to \infty} \frac{1}{(2N+1)T} \frac{\Delta T}{T} \frac{\sin(\omega \Delta T/2)}{\omega \Delta T/2} e^{-i\omega T/2} \sum_{n=-N}^{n=N} e^{-i\omega(nT+dT(n))}$$

where $\omega = 2\pi k/T$. The mean value of this coefficient for various realizations of the random deviation $dT(n)$ 28 is given by:

$$E[\overline{F}_k] = \lim_{N \to \infty} \frac{1}{(2N+1)T} \frac{\Delta T}{T} \frac{\sin(\omega \Delta T/2)}{\omega \Delta T/2} e^{-i\omega T/2} \sum_{n=-N}^{n=N} e^{-i\omega nT} E[e^{-i\omega dT(n)}]$$

where we recognize the Fourier coefficient of the original signal modified by a term coming from the random deviation introduced according to the invention:

$$E[\overline{F}_k] = F_k E[e^{-i\omega dT(n)}]$$

If, for example, a discrete law with M values $dT_m$ of like probability is taken as probability law for the random deviation dT, in this case, the harmonic of rank k of the original signal will be multiplied by the value:

$$\frac{1}{M} \sum_{m=1}^{M} \left( e^{-2i\pi \frac{dT_m}{T}} \right)^k$$

Knowing that $$\sum_{m=1}^{M} (e^{-2i\pi m/M})^k = 0 \text{ for } k = 1, \ldots, M-1$$

we deduce from this that an equi-distributed spread of the values $dT_m$ between two values $-dT_{max}$ and $dT_{max}$, namely:

$$dT_m = -dT_{max} + 2\left(\frac{m-1}{M-1}\right) dT_{max} \text{ for } m = 1, \ldots, M-1$$

makes it possible to eliminate the first M−1 harmonics of the original signal.

For example, for M=3, let us consider a random deviation taking the values −dTmax, 0, and dTmax each with a probability of ⅓. In the case where dTmax/T=⅓, the first two harmonics of the original signal, at the frequencies 1/T and 2/T, are eliminated, as shown by FIG. 4c which represents the spectrum of the signal in this case.

Figure 4B:
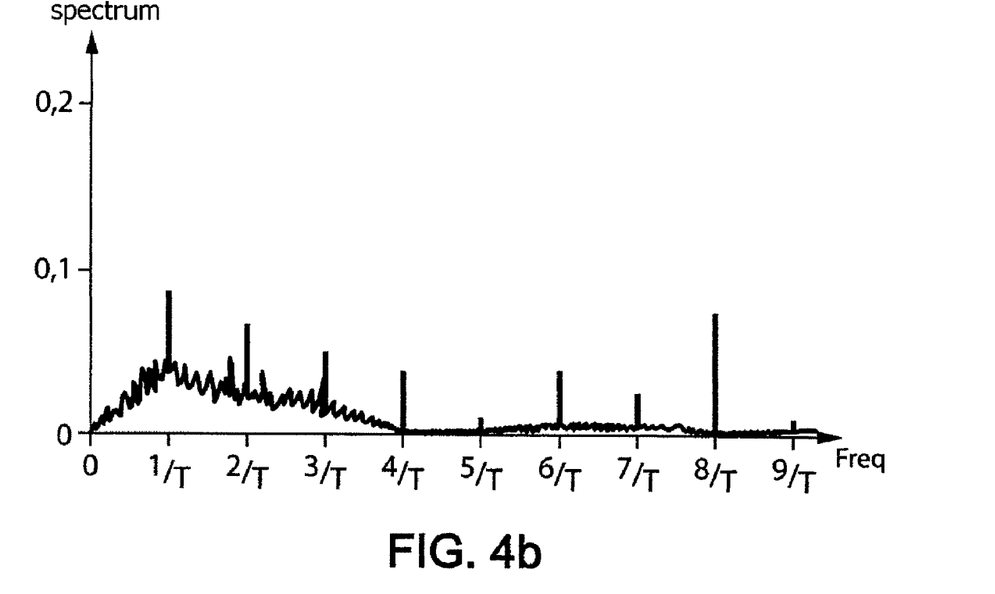
Figure 4C:
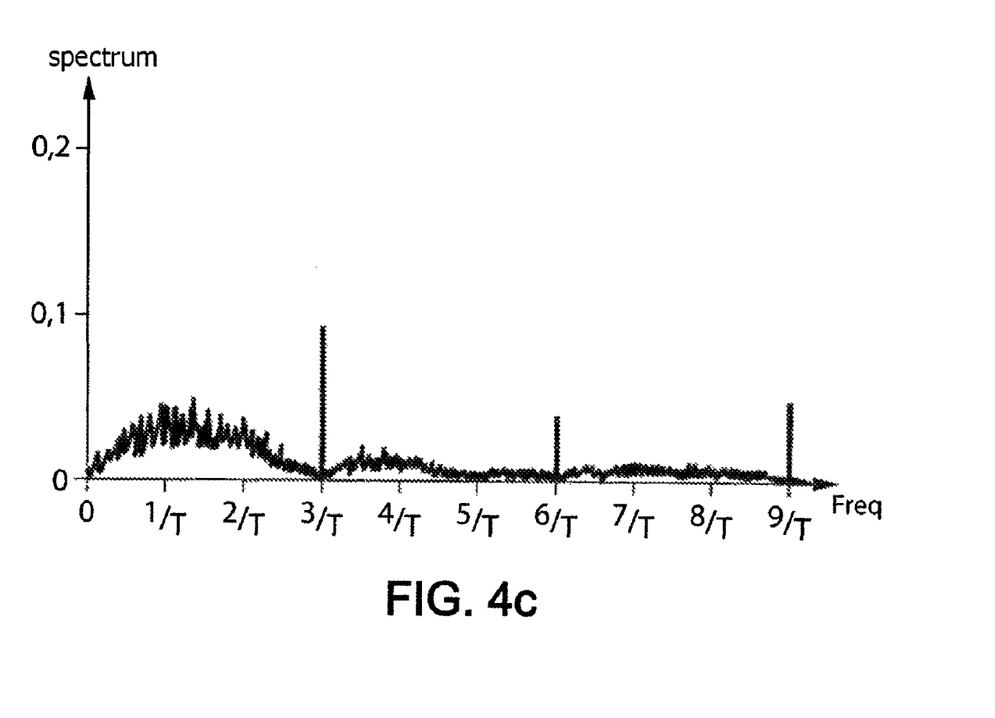

It should be noted that a less significant random deviation, corresponding to dTmax/T=¼, without strictly eliminating the first harmonics, would nevertheless have attenuated them strongly, as shown in FIG. 4b which represents the spectrum of the signal in this case.

In general, a probability law is calculated, according to the method, so as to generate time deviations (dTi) that are random in relation to the reference instant of the application signal with the aim of modifying the frequency spectrum of the control signal. It is possible, for example, to use a uniform probability law, that is to say that the time deviation is distributed over an interval lying between two external values, for example [−dTmax, dTmax]. Each of the values of this interval has an equal probability of being applied. In such a case, it may be shown that the coefficient of attenuation of the spectrum of the initial control signal is given at the frequencies that are multiples of the sampling frequency by the expression:

$$\frac{\sin(\omega dT_{max})}{\omega dT_{max}} \text{ where } \omega = 2\pi k / T$$

The spectrum of the control signal can be attenuated more or less by altering the value of dTmax. The more the value of dTmax is increased, the more the probability of the instant of application of the increment is distributed, and the more the attenuation of the energy peaks of the original signal at the frequencies that are multiples of the sampling frequency increases.

Another example of a usable probability law is the example of the binomial probability law in which the value −dTmax has a probability of being applied equal to P, whereas the temporal deviation value +dTmax has a probability of being applied equal to 1−P. In such a case, one generally uses P=½, that is to say the negative delay −dTmax and the positive delay +dTmax have an equal probability of being applied. In this case, the attenuation coefficient is given by:

$$\cos(\omega dT_{max}) \text{ where } \omega = 2\pi k/T$$

In particular, in the case where dTmax equals T/4, the odd harmonics of the original signal disappear completely.

Other probability laws may be used to establish the control. Furthermore, it is recalled that it is possible to use pre-generated sequences of pseudo random numbers. This generation may be performed before launching a satellite 1 and written into the memory 9, or during operation by virtue of a random number generator which generates a sequence whose spectral properties make it possible to attenuate harmonics that are close to one or more resonant frequencies.

Furthermore, it should be noted that, in the case of the control of thrusters 3, it is possible to modify the duration of the pulses so that it is possible to ensure, in addition to the desired displacement setpoint, a control of the pointing or positioning of the satellite 1 simultaneously. Likewise, in the case of the orientation of the solar panels 2, the increment can be modified over time so that it is possible, for example, to steer a solar sail satellite.

The invention claimed is:

1. A method of generation of a control signal for controlling at least one mechanical system exhibiting at least one flexible structure element and at least one actuator or group of actuators, said method being implemented by calculation and computing means; said method being intended to reduce the level of vibrations of said flexible structure element while controlling said actuator or group of actuators in such a way as to achieve at least one objective assigned to said mechanical system, said control signal comprising increments and energy peaks, each of said increments being either constant in amplitude between two successive sampling instants or applied during an increment application interval of a duration ΔT which is less than or equal to a sampling period T, wherein said method includes at least a step according to which, in each sampling interval, a variable, random or pseudo-random, temporal deviation (dT), termed random deviation is added to at least one of an initial and a final instants of application of said increment, wherein a probability law chosen to determine said random deviation is defined in such a way as to modify at least one of the energy peaks of said control signal.

2. The method according to claim 1, wherein the duration of application of said increments is equal to said sampling period T, and a random deviation is added to said initial instant of application of said increments.

3. The method according to claim 1, wherein the duration of application ΔT of said increments is strictly less than said sampling period T and a random deviation is added either at said initial instant, or at said final instant, or at both said initial and final instants of application of said increments.

4. The method according to claim 3, wherein in each sampling interval, a same random deviation is added both at said initial instant and at said final instant of application of said increments.

5. The method according to claim 1, wherein the maximum absolute value of said random deviation is less than a fixed value.

6. The method according to claim 1, wherein said random deviation has zero mean.

7. The method according to claim 1, wherein values of said random deviation are selected from integer multiples of a predefined value T'.

8. The method according to claim 7, wherein said predefined value T' is an integer divider of said sampling period T.

9. The method according to claim 7, wherein a frequency 1/T' is chosen in such a way as to limit any resonances with the modes of vibration of said flexible structure element, and do not coincide with natural frequencies of said vibration modes.

10. The method according to claim 1, wherein a probability law chosen to determine said random deviation is fully defined by a finite number of parameters calculated in such a way as to modify at least one of energy peaks of said control signal.

11. The method according to claim 1, wherein a probability law chosen to determine said random deviation is a discrete probability law with M values, said M values and their probabilities being calculated in such a way as to modify at least one of energy peaks of said control signal.

12. The method according to claim 11, wherein said probability law is a binomial law taking extreme values of random deviation +dTmax with a probability of ½, and −dTmax with a probability of ½.

13. The method according to claim 11, wherein said probability law is a discrete law with M equiprobable values in arithmetic progression between a minimum value −dTmax and a maximum value +dTmax of said random deviations, with dTmax=T.(M−1)/2M.

14. The method according to claim 1, wherein a probability law chosen to determine said random deviation is a law which is uniform between extreme values of random deviation dTmin and dTmax, said values dTmin and dTmax being chosen to modify at least one energy peak of said control signal.

15. The method according to claim 14, wherein said probability law is a law which is uniform between maximum values −dTmax and dTmax.

16. The method according to claim 15 wherein, in each sampling interval a same random deviation is added both at said initial instant and at said final instant of application of said increments, and wherein dTmax=T/2, so that the spectrum of said control signal does not include any energy peak at a sampling frequency 1/T.

17. The method according to claim 15 wherein, in each sampling interval a same random deviation is added both at said initial instant and at said final instant of application of said increments, and wherein dTmax=T/4, so that the spectrum of said control signal does not include any energy peak at odd multiple frequencies of a sampling frequency 1/T.

18. The method according to claim 1, wherein said random deviations take the values of successive numbers of at least one random or pseudo-random sequence of numbers that is produced at each said sampling period by at least one computer program generating random or pseudo-random numbers.

19. The method according to claim 1, wherein said random deviations take the values of successive numbers of a long but finite sequence of numbers exhibiting random characteristics close to desired characteristics, said sequence being precalculated and applied according to said method, then reproduced in a loop once it is completed.

20. The method according to claim 1, wherein it further includes a step consisting in controlling the opening of at least one thruster of a system for control of orbit, stabilization or orientation of a craft moving through space, said craft comprising at least one flexible structure element.

21. The method according to claim 1, wherein it further includes steps consisting in
controlling the opening of at least one thruster so as to impart a speed increment to said craft making it possible to correct the trajectory of said craft;
nominally carrying out said speed increment as a series of increments performed periodically with a period T;
carrying out said increments through a control signal of opening of at least one thruster, said control signal being conventionally equal to zero for a thruster closure order, and to one for a thruster opening order;
before the implementation of said method, calculating a nominal control signal so as to be periodic of period T in the time interval [Ti, Ti +N.T], where N is an integer, for realizing a total impulse, and, in said time interval, equal to an increment of one over all the time intervals [Ti+ k.T+T1, Ti +k.T+T2] where k is an integer less than N, T1 and T2 being constants such that 0<T1<T2<T, T2−T1 being the width (ΔT) of a control notch carrying out said impulses, and equal to 0 the remainder of the time;
modifying said nominal control signal according to a method of controlling at least one mechanical system exhibiting at least one flexible structure element and at least one actuator or group of actuators, said method being intended to reduce the level of vibrations of said flexible structure element while controlling said actuator or group of actuators in such a way as to achieve at least one objective assigned to said mechanical system, said control signal comprising increments, each of said increments being either constant in amplitude in a sampling time interval extending between two successive sampling instants or being applied during an increment application interval of a duration ΔT which is less than or equal to said sampling period T, said method including at least a step according to which, in each sampling interval, at least one of an initial and a final instants of application of said increment is modified by adding a variable, random or pseudo-random, temporal deviation (dT), termed random deviation, said nominal control signal modified by adding to at least one of said initial Ti+k.T+T1 and final Ti+k.T+T2 instants of application of the increment, a random temporal deviation having desired characteristics with the aim of minimizing the resonances of said control signal with the modes of vibration of said flexible structure element; and in the case where a random deviation is applied at both said initial and final instants of application of said increment, said random deviation being able to be the same for both said instants, in which case said control notch is simply translated randomly in time, or indeed being able to be different for one from what it is for the other of both said instants.

22. The method according to claim 21, wherein on top of said random deviations is added to one only of said initial and final instants of application of said increment another temporal deviation, calculated in a known manner to carry out an attitude or pointing control of said space craft at the same time as the speed increment control is carried out for the orbit control.

23. The method according to claim 1, wherein it includes a step consisting in controlling the rotation of at least one stepper motor for the pointing of at least one payload of a space craft, said payload exhibiting at least one flexible structure element.

24. The method according to claim 23, wherein
a control a of an angle between a stator and a rotor of said motor is sampled at a sampling period T, and is incremented by a certain value at each sampling period,
a nominal control α takes the form: $\alpha_k = \alpha_{k-1} + (d\alpha)_k$ where $\alpha_k$ represents a constant value of said control between instants k.T and (k+1).T, where k is an integer, and $(d\alpha)_k$ is the value of an increment to be carried out at the date k.T, the increments being performed by convention at sampling instants,
said control signal is modified according to a method of generation of a control signal for controlling at least one mechanical system exhibiting at least one flexible structure element and at least one actuator or group of actuators, said method being intended to reduce the level of vibrations of said flexible structure element while controlling said actuator or group of actuators in such a way as to achieve at least one objective assigned to said mechanical system, said control signal comprising increments, each of said increments being either constant in amplitude in a sampling time interval extending between two successive sampling instants or applied during an increment application interval of a duration ΔT which is less than or equal to said sampling period T, said method including at least a step according to which, in each sampling interval, at least one of an initial and a final instants of application of said increment is modified by adding a variable, random or pseudo-random, temporal deviation (dT), termed random deviation, said control signal is modified by adding, to said instants k.T at which said increments are carried out, a random time deviation having desired characteristics with the aim of minimizing resonances with modes of vibration of said flexible structure element.

25. The method according to claim 24, wherein said increments $(da)_k$ are all equal, as in the case of keeping a solar panel rotating at constant speed.

26. The method according to claim 24, wherein said nominally equal increments $(d\alpha)_k$ are slightly modified, in a known manner, so as to carry out said control signal of at least one physical phenomenon resulting from the rotation of said motor.

27. The method according to claim 25, wherein the frequency spectrum of a nominal control to be applied to said motor is situated principally at frequencies well below said sampling frequency.

28. The method according to claim 1, wherein the increments have to be carried out at a sampling period T.

29. A CPU comprising a computer program comprising code instructions adapted for the implementation of said method according to claim 1, when said program is loaded and executed on computing means.

30. A device for implementing the method according to claim 1, said device comprising calculation and computing means allowing the execution of the computer program comprising code instructions adapted for the implementation of said method, said program is loaded and executed on computing means, and electrical and/or electronic means making it possible to transform digital control orders formulated by said calculation and computing means into electrical signals dispatched to at least one actuator, said device being such that
at least one computer program of said program is implemented by said calculation and computing means so as to produce said increments of said control signal of at least one of said actuator and group of actuators of said mechanical system in such a way as to achieve at least one objective assigned to said mechanical system;
said computer program is implemented to produce, at each said sampling period T, said random deviation according to a probability law that best approximates a desired probability law;
said computer program is implemented to modify said instant or instants of application of said increment by adding thereto said random deviation, according to said method of claim 34, and to thus produce a digital control signal to actually be applied to said mechanical system;
said electrical and/or electronic means transform said digital control signal produced by said computer program into electrical signals allowing at least one of said actuator and group of actuators to physically carry out an assigned control signal.

31. The device according to claim 30 for the implementation of a method of controlling at least one mechanical system exhibiting at least one flexible structure element and at least one actuator or group of actuators, said method being intended to reduce the level of vibrations of said flexible structure element while controlling said actuator or group of actuators in such a way as to achieve at least one objective assigned to said mechanical system, said control signal comprising increments, each of said increments being either constant in amplitude in a sampling time interval extending between two successive sampling instants or applied during an increment application interval of a duration ΔT which is less than or equal to a sampling period T, said method including at least a step according to which, in each sampling interval, a variable, random or pseudo-random, temporal deviation (dT), termed random deviation, is added to at least one of an initial and a final instants of application of said increment, wherein said random deviations take the values of successive numbers of a sequence of numbers exhibiting random characteristics close to desired characteristics, said sequence being precalculated and applied according to said method, then reproduced in a loop once it is completed, wherein a sequence of random deviations having desired random characteristics is calculated beforehand, then stored in a memory of said calculation and computing means, said random deviations being, successively and in an established order, added to at least one instant of application of said increments of said control signal, said sequence being reproduced in a loop once it has been completed.

32. The device according to claim 30, wherein at least part of all parameters involved in the calculation of said random deviations by said computer program may be modified in the course of the operation of said mechanical system.

33. The device according to claim 32, comprising at least one dedicated sensor for measuring the vibrations of at least one flexible structure element present in said mechanical system, means for calculating the frequency spectrum of said vibrations, and means for modifying parameters involved in the calculation of said random deviations so as to reduce the level of said vibrations by modifying at least one of energy peaks of the frequency spectrum of said control signal.

34. A method of generation of a control signal for controlling at least one mechanical system exhibiting at least one flexible structure element and at least one actuator or group of actuators, said method being implemented by calculation and computing means; said control signal comprising increments and energy peaks, said increments having a constant amplitude between an initial instant and a final instant, wherein at least one instant among said initial instant and said final instant is shifted from a random deviation with respect to a clock signal, said clock signal having a sampling intervals of constant period T; said random deviation being a random or pseudo-random, temporal deviation (dT), said random deviation being variable from one sampling interval to the next sampling interval; said random deviation being less than the period T, wherein a probability law chosen to determine said random deviation is defined in such a way as to modify at least one of the energy peaks of said control signal.

* * * * *